United States Patent
Desai et al.

(10) Patent No.: US 12,248,363 B2
(45) Date of Patent: Mar. 11, 2025

(54) STORAGE DEVICE NON-FATAL ERROR DEBUG SYSTEM

(71) Applicant: Dell Products L.P., Round Rock, TX (US)

(72) Inventors: Girish Desai, Fremont, CA (US); Alex Liu, Fremont, CA (US)

(73) Assignee: Dell Products L.P., Round Rock, TX (US)

(*) Notice: Subject to any disclaimer, the term of this patent is extended or adjusted under 35 U.S.C. 154(b) by 73 days.

(21) Appl. No.: 18/164,752

(22) Filed: Feb. 6, 2023

(65) Prior Publication Data

US 2024/0264892 A1    Aug. 8, 2024

(51) Int. Cl.
G06F 11/00    (2006.01)
G06F 11/07    (2006.01)

(52) U.S. Cl.
CPC ...... G06F 11/0778 (2013.01); G06F 11/0787 (2013.01)

(58) Field of Classification Search
CPC .............. G06F 11/0778; G06F 11/0787
See application file for complete search history.

(56) References Cited

U.S. PATENT DOCUMENTS

| 10,346,238 | B2 | 7/2019 | Lv et al. | |
|---|---|---|---|---|
| 10,608,948 | B1* | 3/2020 | Leib | H04L 43/065 |
| 10,992,580 | B2* | 4/2021 | Mazurek | H04L 49/30 |
| 11,848,840 | B1* | 12/2023 | Bhagavathiperumal | H04L 43/026 |
| 2014/0325121 | A1* | 10/2014 | Akutsu | G06F 3/0683 711/103 |
| 2015/0347055 | A1* | 12/2015 | Truong | G06F 3/0653 711/168 |
| 2016/0092292 | A1* | 3/2016 | Lv | G06F 11/0727 714/37 |
| 2016/0231948 | A1* | 8/2016 | Gupta | G06F 3/0688 |
| 2017/0214605 | A1* | 7/2017 | Astigarraga | H04L 45/28 |
| 2018/0165169 | A1* | 6/2018 | Camp | G06F 3/064 |
| 2018/0267962 | A1* | 9/2018 | Sprague | G06F 3/067 |
| 2018/0307712 | A1* | 10/2018 | Baradaran | G06F 16/217 |
| 2020/0019439 | A1* | 1/2020 | Shibayama | G06F 9/5016 |
| 2021/0127315 | A1* | 4/2021 | Subbiah | H04L 45/20 |
| 2022/0029902 | A1* | 1/2022 | Shemer | H04L 41/0686 |
| 2022/0158922 | A1* | 5/2022 | Srivastava | H04L 49/351 |

(Continued)

*Primary Examiner* — Loan L. T. Truong
(74) *Attorney, Agent, or Firm* — Joseph Mencher

(57) ABSTRACT

A storage device non-fatal error debug system includes a storage device including a storage device chassis, storage device subsystems housed in the storage device chassis, and a non-fatal error debug subsystem provided in the storage device chassis and coupled to each of the storage device subsystems. The non-fatal error debug subsystem provides a counter system for each of a plurality of data path stages performed by the storage device subsystems to provide data path(s) in the storage device, and monitors each counter system during the execution of commands by the storage device subsystems via the performance of the data path stages. When the non-fatal error debug subsystem determines that a counter system provided for a data path stage performed by a storage device subsystem to provide a data path in the storage device indicates a non-fatal error, it collects debug information associated with that data path stage.

20 Claims, 8 Drawing Sheets

(56) References Cited

U.S. PATENT DOCUMENTS

| | | | |
|---|---|---|---|
| 2022/0239585 A1* | 7/2022 | Mishra | H04L 45/24 |
| 2023/0153206 A1* | 5/2023 | Hosmani | G06F 11/108 |
| | | | 714/6.24 |

* cited by examiner

STORAGE DEVICE NON-FATAL ERROR DEBUG SYSTEM

BACKGROUND

The present disclosure relates generally to information handling systems, and more particularly to debugging non-fatal errors that occur in storage devices used in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, utilize storage devices such as, for example, Solid State Drive (SSD) storage devices, in order to store data. As will be appreciated by one of skill in the art in possession of the present disclosure, SSD storage devices are designed to guarantee data integrity and prevent the return of incorrect data to a host processing system in their computing devices, but SSD storage devices have limited hardware and firmware resources to handle the read, write, and/or other Input/Output (I/O) commands provided by the host processing system, as well as the background operations required for the SSD storage device. As such, I/O commands and background operations are handled by SSD storage devices via data path pipelines that may multiplex multiple I/O commands and/or background operations across different stages that provide those data path pipelines. In some situations, this can result in resource contention that can result in I/O operation "hangs", timeouts, performance degradation, and/or other storage devices issues known in the art.

For example, SSD storage devices are subject to two types of errors: fatal errors and non-fatal errors. Fatal errors (also called "assert conditions") are produced by definitive or otherwise known exception events that can lead to a loss of data integrity in the storage device. In response to detecting a fatal error, the storage device will cease processing read and write I/O commands and background operations (while in some cases continuing to process non-data I/O commands), and will collect debug information for the fatal error event and inform the host processing system about the fatal error experienced by the storage device, which allows the host processing system to later retrieve and analyze that debug information to attempt to determine a root cause of the fatal error. Examples of fatal errors may include double-bit errors that are not correctable by Error Correction Code (ECC) (i.e., due to that ECC only being configured to correct single-bit errors), a NAND device in the SSD storage device reaching its Program/Erase (P/E) cycle limit, and/or other fatal errors that would be apparent to one of skill in the art in possession of the present disclosure.

However, non-fatal errors are not well defined, and thus their cause is often not easily predictable. For example, non-fatal errors are asynchronous with the I/O command or background operation that may have caused them (in that they are delayed from the receipt of that I/O command or background operation), and are not capable of being handled by code running on the storage device. In response to a non-fatal error occurring in a storage device, that storage device will continue processing I/O commands and/or background operations until one or more of its resources are exhausted and cause the I/O operation "hangs", timeouts, performance degradation, and/or other storage devices issues discussed above. For example, in response to a non-fatal error, the host processing system may continually retry the processing of the I/O command until an I/O command processing retry failure threshold is reached and the host processing system must reinitialize the storage device in order to recover. As will be appreciated by one of skill in the art in possession of the present disclosure, non-fatal errors do not conventionally result in the collection of debug information, and the host processing system is not notified of their occurrence. As such, host processing systems conventionally detect non-fatal errors only in response to the failure of the I/O processing retry discussed above, which occurs relatively long after the collection of any debug information would provide any useful information in determining the root cause of that non-fatal error.

Accordingly, it would be desirable to provide a storage device non-fatal error debug system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a non-fatal error debug engine that is configured to: provide a counter system for each of a plurality of data path stages performed by a plurality of storage device subsystems in a storage device to provide at least one data path in the storage device; monitor each counter system during the execution of commands by the plurality of storage device subsystems via the performance of the plurality of data path stages; determine that a first counter system provided for a first data path stage performed by a first storage device subsystem to provide a first data path in the storage device indicates a first non-fatal error; and collect, in response to determining that the first counter system indicates the first non-fatal error, debug information associated with the first data path stage.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
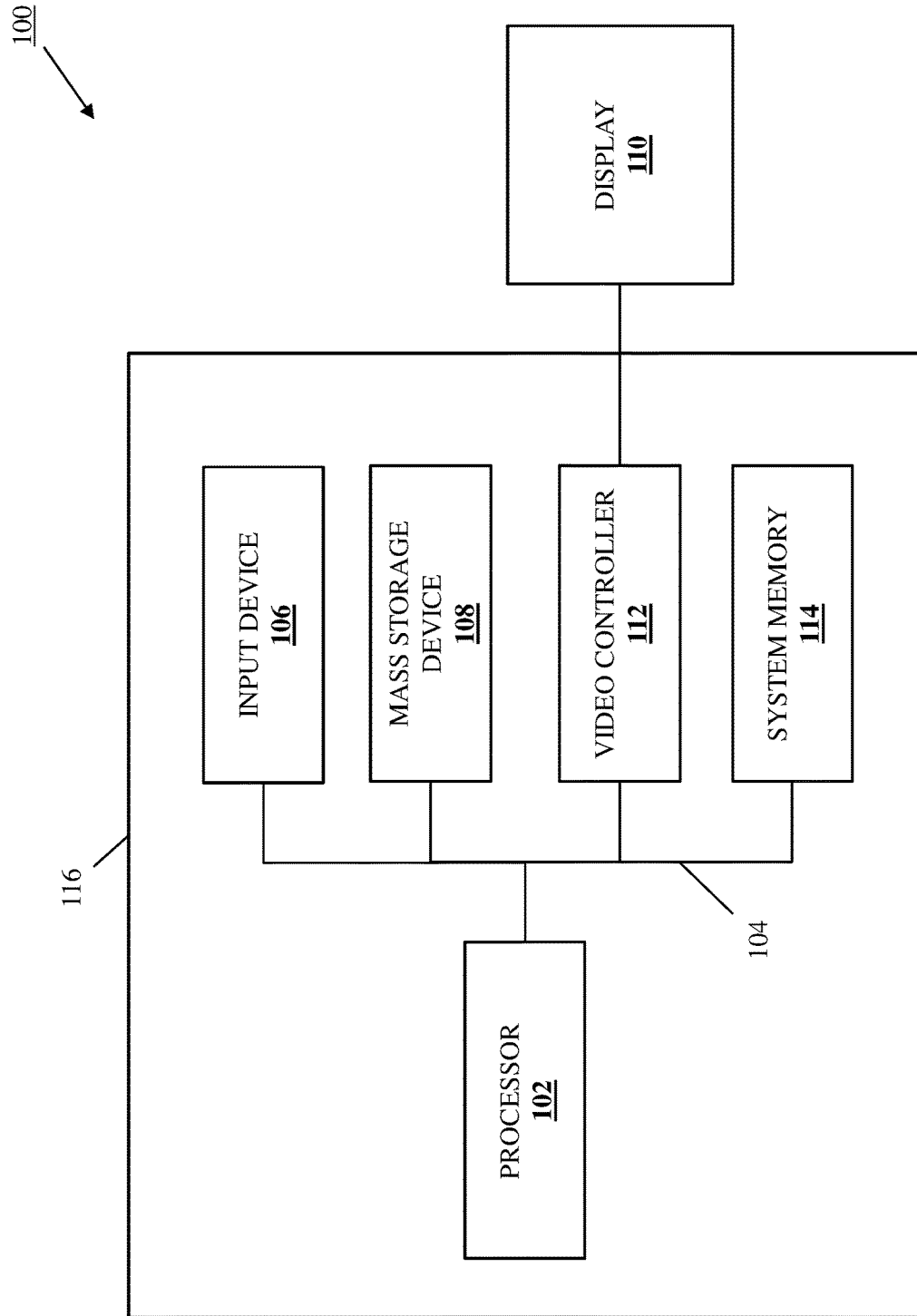
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
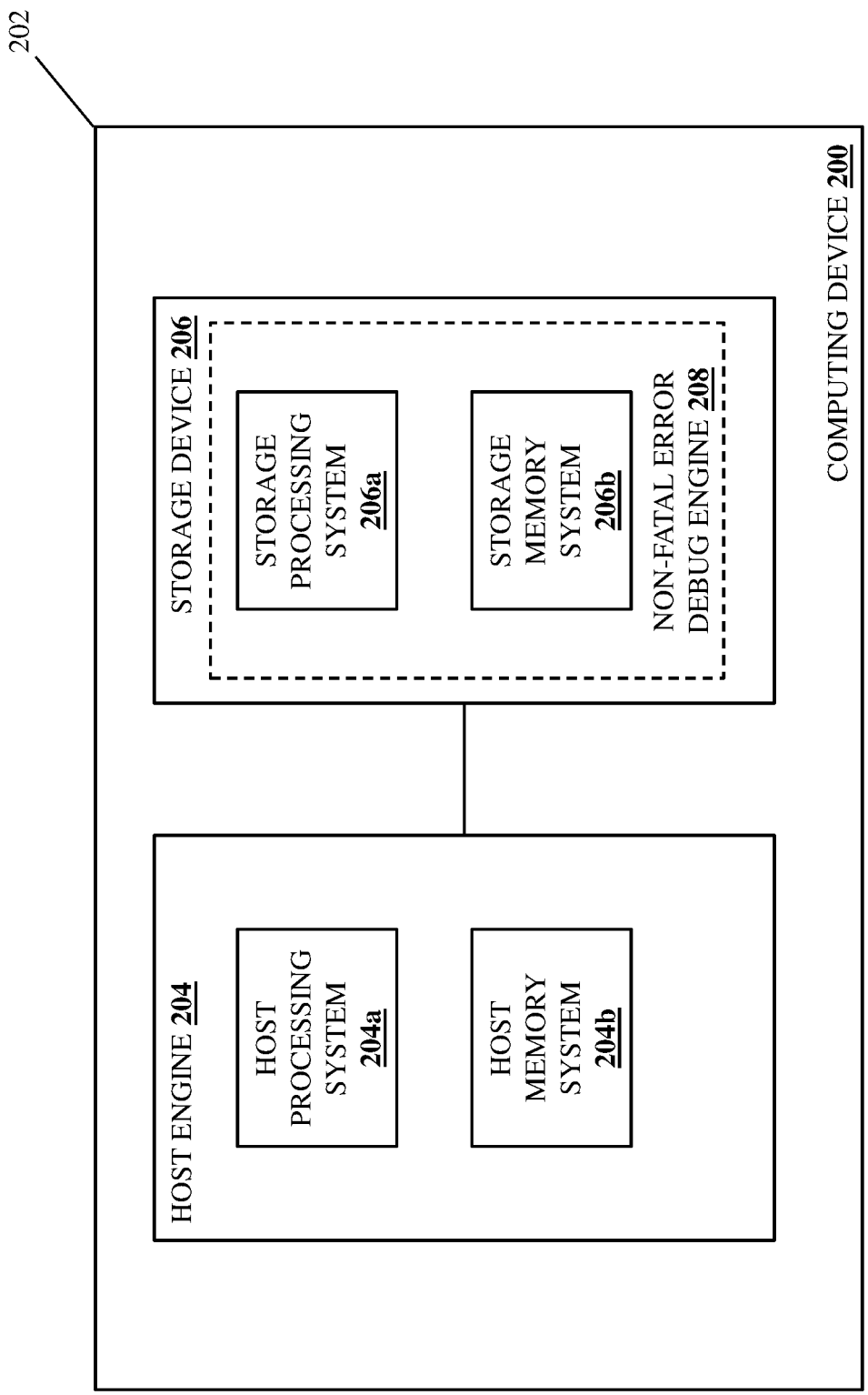
FIG. 2 is a schematic view illustrating an embodiment of a computing device that may include a storage device having the non-fatal error debug system of the present disclosure.

Referring now to FIG. 2, an embodiment of a computing device 200 is illustrated that may include a storage device having the non-fatal error debug system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and described below. For example, the chassis 202 may house a host processing system 204a (e.g., the processor 102 discussed above with reference to FIG. 1 such as a Central Processing Unit (CPU)) and a host memory system 204b (e.g., the memory 114 discussed above with reference to FIG. 1 such as a Dynamic Random Access Memory (DRAM) system) that is coupled to the host processing system 204a and that includes instructions that, when executed by the host processing system 204a, cause the host processing system 204a to provide a host engine 204 that is configured to perform the functionality of the host engines and/or computing devices discussed below.

The chassis 202 may also house a storage device 206 that may include the non-fatal error debug system of the present disclosure and that is coupled to the host engine 204 (e.g., via a coupling between the storage system and the host processing system 204a). In an embodiment, the storage device 300 may be provided by the IHS 100 discussed above with reference to FIG. 1 and/or may include some or all of the components of the IHS 100, and in specific examples may be provided by a Solid State Drive (SDD) storage device such as a Non-Volatile Memory express (NVMe) SSD storage device. However, while illustrated and discussed as being provided by a particular type of storage device, one of skill in the art in possession of the present disclosure will recognize that the functionality of the storage device 206 discussed below may be provided by other types of storage devices that are configured to operate similarly as the storage device 206 discussed below.

In the illustrated embodiment, the storage device 206 includes a storage processing system 206a (e.g., the processor 102 discussed above with reference to FIG. 1 such as an Application Specific Integrated Circuit (ASIC), a firmware processing system, etc.) and a storage memory system 206b that is coupled to the storage processing system 206a and that includes instructions that, when executed by the storage processing system 206a, cause the storage processing system 206a to provide a non-fatal error debug engine 208 that is configured to perform the functionality of the non-fatal error debug engines and/or storage devices discussed below. However, while a specific computing device 200 has been illustrated and described, one of skill in the art in possession of the present disclosure will recognize that computing devices (or other devices operating according to the teachings of the present disclosure in a manner similar to that described below for the computing device 200) including storage devices the non-fatal error debug system of the present disclosure may include a variety of components and/or component configurations for providing conventional computing device functionality, as well as the functionality discussed below, while remaining within the scope of the present disclosure as well.

Figure 3:
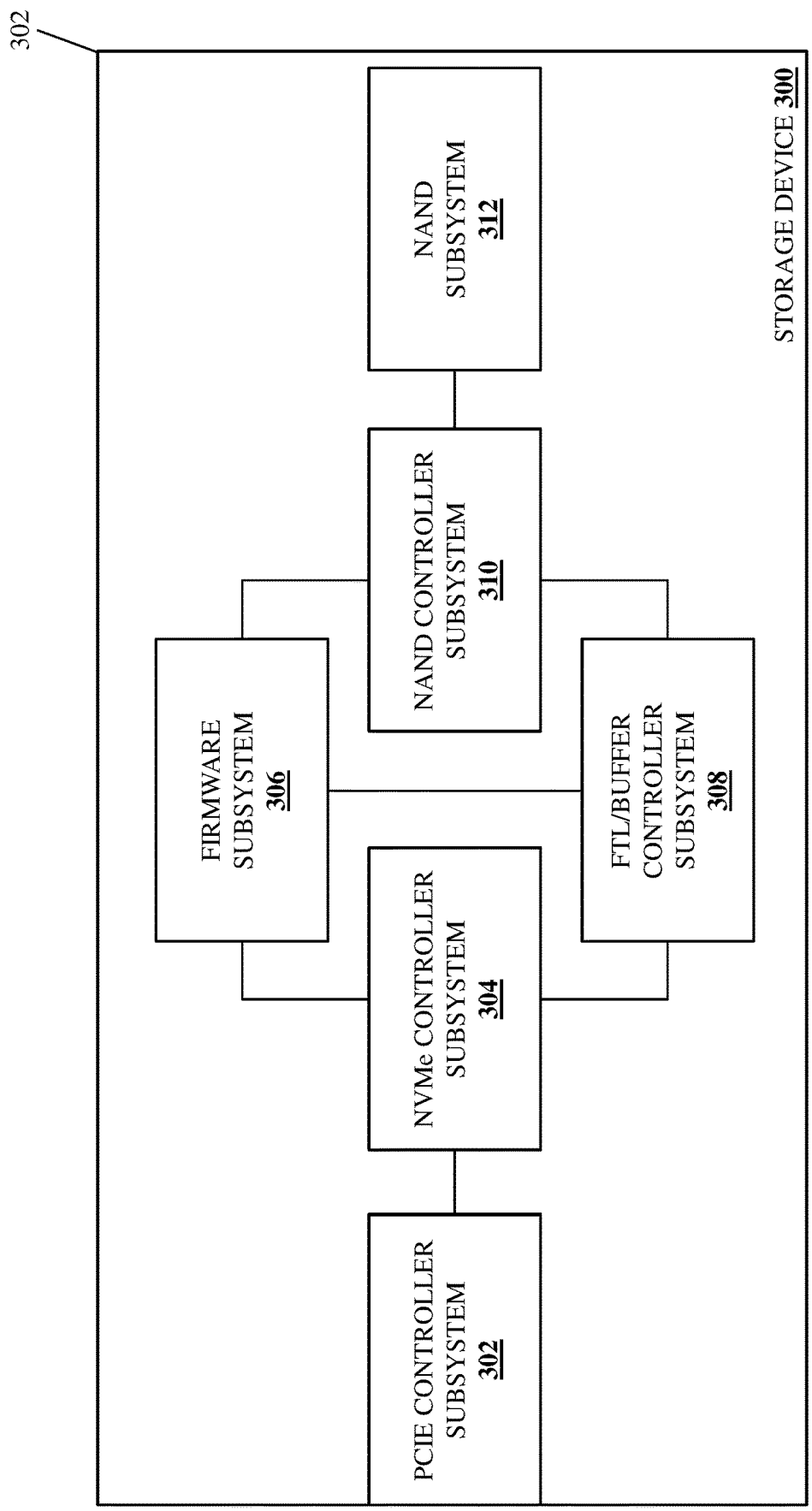
FIG. 3 is a schematic view illustrating an embodiment of a storage device that may be provided in the computing device of FIG. 2 and that may include the non-fatal error debug system of the present disclosure.

Referring now to FIG. 3, an embodiment of a storage device 300 is illustrated that may provide the storage device 206 discussed above with reference to FIG. 2. As such, the storage device 300 may be provided by the IHS 100 discussed above with reference to FIG. 1 and/or may include some or all of the components of the IHS 100, and in specific examples may be provided by an SSD storage device such as an NVMe SSD storage device. However, while illustrated and discussed as being provided by a particular type of storage device, one of skill in the art in possession of the present disclosure will recognize that the functionality of the storage device 300 discussed below may be provided by other types of storage devices that are configured to operate similarly as the storage device 300 discussed below. In the illustrated embodiment, the storage device 300 includes a chassis 302 that houses a plurality of storage device subsystems that provide the functionality of the storage device 300, only some of which are illustrated and discussed below.

For example, in the embodiments illustrated and described below, the storage device subsystems housed in the chassis 302 include a Peripheral Component Interconnect express (PCIe) controller subsystem 302 that is configured to couple the storage device 300 to components such as the host processing system 204a/host engine 204 discussed above with reference to FIG. 2 and perform any of a variety of PCIe control operations that are discussed below and/or that would be apparent to one of skill in the art in possession of the present disclosure. The storage device subsystems housed in the chassis 302 also include an NVMe controller subsystem 304 that is coupled to the PCIe controller subsystem 302 and that is configured to perform any of a variety of NVMe control operations that are discussed below and/or that would be apparent to one of skill in the art in possession of the present disclosure. The storage device subsystems housed in the chassis 302 also include a firmware subsystem 306 that is coupled to the NVMe controller subsystem 304 and that is configured to perform any of a variety of storage firmware operations that are discussed below and/or that would be apparent to one of skill in the art in possession of the present disclosure. The storage device subsystems housed in the chassis 302 also include a Firmware Translation Layer (FTL)/buffer controller subsystem 308 that is coupled to the NVMe controller subsystem 304 and the firmware subsystem 306, and that is configured to perform any of a variety of FTL/buffer control operations that are discussed below and/or that would be apparent to one of skill in the art in possession of the present disclosure. The storage device subsystems housed in the chassis 302 also include a NAND controller subsystem 310 that is coupled to the firmware subsystem 306 and the FTL/buffer controller subsystem 308, and that is configured to perform any of a variety of NAND control operations that are discussed below and/or that would be apparent to one of skill in the art in possession of the present disclosure.

The storage device subsystems housed in the chassis 302 also include a NAND subsystem 312 that is coupled to the NAND controller subsystem 310 and that may include NAND chips that are configured to store data for the storage device 300 and/or perform any of a variety of NAND operations that are discussed below and/or that would be apparent to one of skill in the art in possession of the present disclosure. As discussed below and as would be apparent to one of skill in the art in possession of the present disclosure, the storage device subsystems such as the storage PCIe controller subsystem 302, the NVMe controller subsystem 304, the firmware subsystem 306, the FTL/buffer controller subsystem 308, the NAND controller subsystem, and/or the NAND subsystem 312 of the illustrated embodiment may receive and execute read commands (e.g., received from the host engine 204 of FIG. 2) to retrieve and deliver data stored on the storage device 300, receive and execute write commands (e.g., received from the host engine 204 of FIG. 2) to receive and store data on the storage device 300, perform background operations (e.g., garbage collection operations, wear leveling operations, etc.), and/or perform other storage device operations that would be apparent to one of skill in the art in possession of the present disclosure. However, while a specific storage device 300 has been illustrated and described, one of skill in the art in possession of the present disclosure will recognize that storage devices (or other devices operating according to the teachings of the present disclosure in a manner similar to that described below for the storage device 300) including the non-fatal error debug system of the present disclosure may include a variety of components and/or component configurations for providing conventional storage device functionality, as well as the functionality discussed below, while remaining within the scope of the present disclosure as well.

Figure 4:
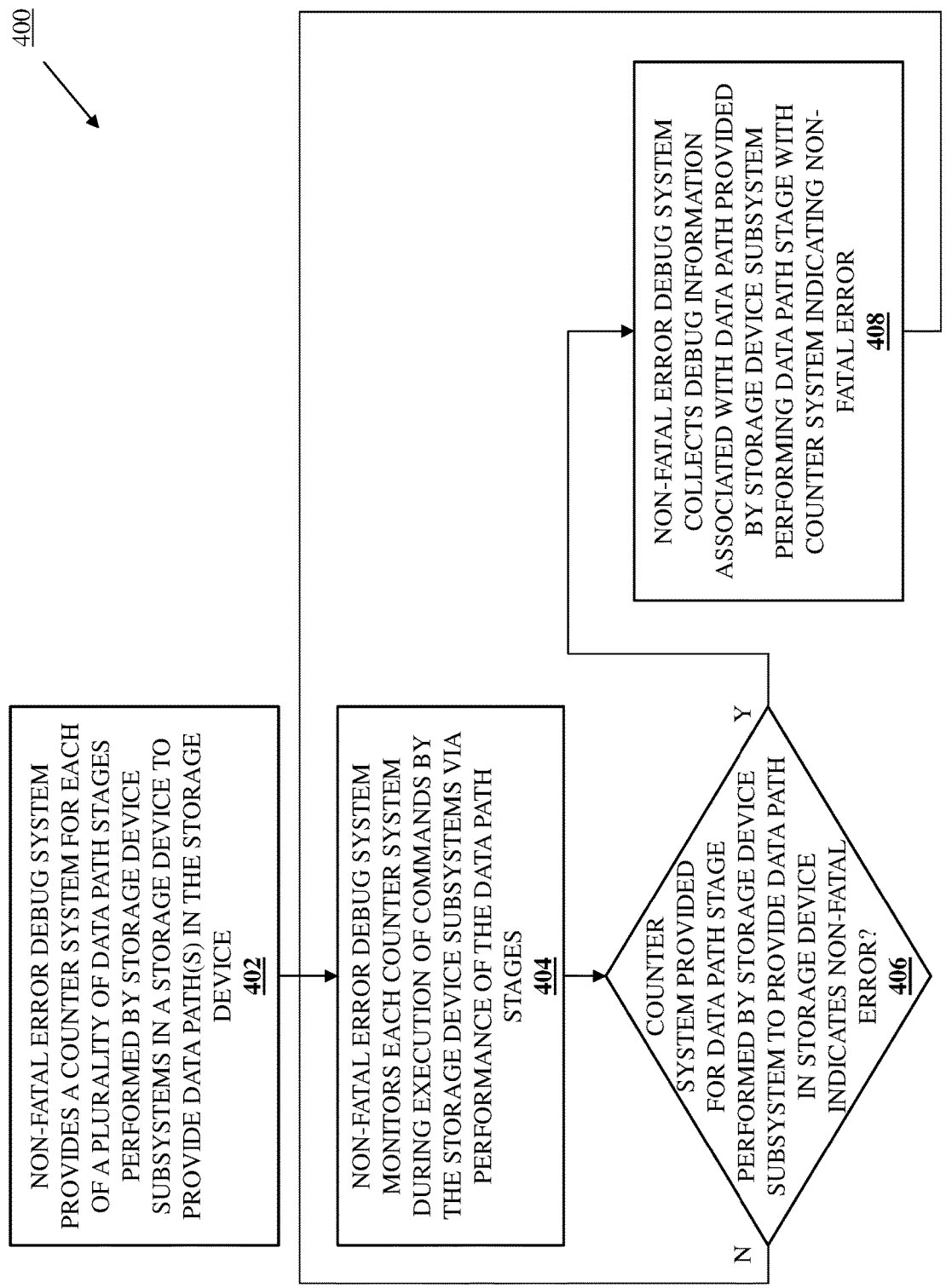
FIG. 4 is a flow chart illustrating an embodiment of a method for debugging non-fatal errors in a storage device.

Referring now to FIG. 4, an embodiment of a method 400 for debugging non-fatal errors in a storage device is illustrated. As discussed below, the systems and methods of the present disclosure provide for the debugging of non-fatal errors in storage device by monitoring counters provided for data path stages in one or more data paths in the storage device to detect whether abnormal conditions exist and, if so, collecting debug information for use in debugging the non-fatal error. For example, the storage device non-fatal error debug system may include a storage device including a storage device chassis, storage device subsystems housed in the storage device chassis, and a non-fatal error debug subsystem provided in the storage device chassis and coupled to each of the storage device subsystems. The non-fatal error debug subsystem provides a counter system for each of a plurality of data path stages performed by the storage device subsystems to provide data path(s) in the storage device, and monitors each counter system during the execution of commands by the storage device subsystems via the performance of the data path stages. When the non-fatal error debug subsystem determines that a counter system provided for a data path stage performed by a storage device subsystem to provide a data path in the storage device indicates a non-fatal error, it collects debug information associated with that data path stage. As such, the root cause of non-fatal errors in storage devices may be identified and, in some cases, corrected.

Figure 5:
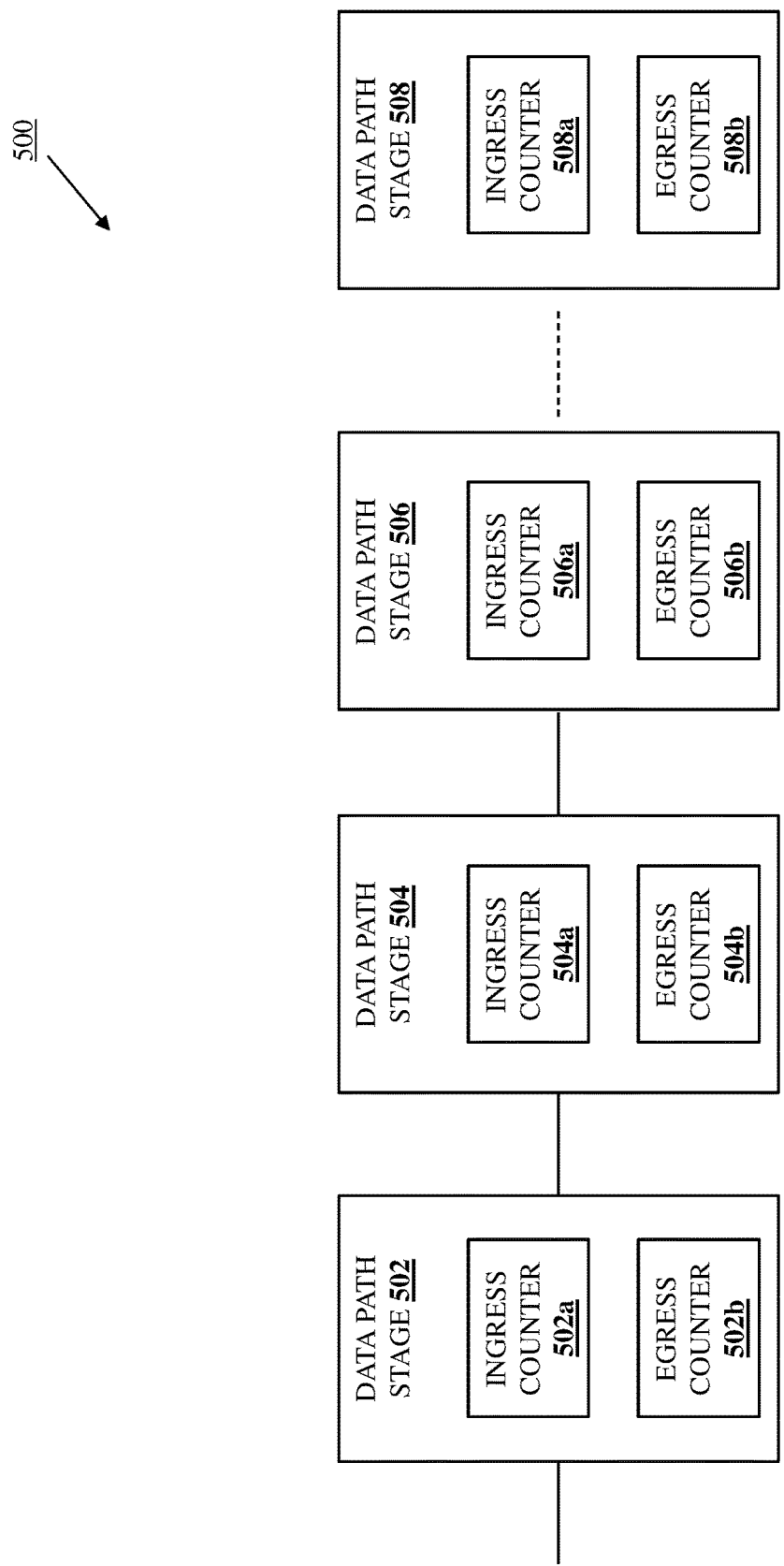
FIG. 5 is a schematic view illustrating an embodiment of a data path provided by data path stages during the method of FIG. 4.

The method 400 begins at block 402 where a non-fatal error debug system provides a counter system for each of a plurality of data path stages performed by storage device subsystems in a storage device to provide data path(s) in the storage device. With reference to FIG. 5, an embodiment of a data path 500 that may be provided in the storage device 206/300 is illustrated, and one of skill in the art in possession of the present disclosure will appreciate how multiple similar data paths may be provided in the storage device 206/300 while remaining within the scope of the present disclosure. For example, data paths may be provided in the storage device 206/300 in order to execute read commands and/or write commands received from the host engine 204 in the computing device 200, background commands generated in the storage device 206/300 in response to a determination that background operations should be performed, and/or other I/O commands that provide for the performance of other storage device functionality that would be apparent to one of skill in the art in possession of the present disclosure.

As illustrated, the data path 500 may include a plurality of data path stages 502, 504, 506, and up to 508, each of which may be performed by any storage device subsystems in the storage device 206/300 (e.g., the PCIe controller subsystem 302, the NVMe controller subsystem 304, the firmware subsystem 306, the FTL/buffer controller subsystem 308, the NAND controller subsystem 310, and/or the NAND subsystem in the embodiment of the storage device 300 illustrated in FIG. 3). As will be appreciated by one of skill in the art in possession of the present disclosure, any of the data path stages 502-508 in the data path 500 illustrated in FIG. 5 may also be performed for other data paths provided in the storage device 206/300 (i.e., data paths other than the data path 500).

For example, the execution of a read command received from the host engine 204 may include the storage device subsystems in the storage device 206/300 (or a subset thereof) performing one or more data path stages that allow data to be read from the NAND subsystem 312 and returned to the host engine 204. In another example, the execution of a write command received from the host engine 204 may include the storage device subsystems in the storage device 206/300 (or a subset thereof) performing one or more data path stages that allow data to be written to the NAND subsystem 312 and a write confirmation returned to the host engine 204. In another example, the execution of a background command generated in the storage device 206/300 may include the storage device subsystems in the storage device 206/300 (or a subset thereof) performing one or more data path stages that allow data to be read from the NAND subsystem, data to be written to the NAND subsystem 312, and/or for the performance of any of a variety of background operations known in the art.

Furthermore, as will be appreciated by one of skill in the art in possession of the present disclosure, any particular type of data path may require different storage device subsystems to perform data path stages to provide that data path. For example, data paths provided in the storage device 206/300 in response to commands may include one or more data path stages performed by the PCIe controller subsystem 302 to receive the command, break the command into 4K data chunks, prepare a buffer in the storage device 206/300 for the data chunks, perform data integrity checks, and/or provide any other PCIe controller functionality that would be apparent to one of skill in the art in possession of the present disclosure. Furthermore, data paths provided in the storage device 206/300 in response to commands may include one or more data path stages performed by the NVMe controller subsystem 304 to perform FTL table lookups, perform read-modify-write detection, perform atomicity checks, perform overlap LBA synchronization, and/or provide any other NVMe controller functionality that would be apparent to one of skill in the art in possession of the present disclosure.

Further still, data paths provided in the storage device 206/300 in response to commands may include one or more data path stages performed by the firmware subsystem 306 to provide error logic operations, garbage collection operations, wear leveling operations, and/or provide any other firmware functionality that would be apparent to one of skill in the art in possession of the present disclosure. Yet further still, data paths provided in the storage device 206/300 in response to commands may include one or more data path stages performed by the FTL/buffer controller subsystem 308 to provide physical address lookups for logical block addresses, read-modify-write operations, read/write collision operations, and/or provide any other FTL/buffer controller functionality that would be apparent to one of skill in the art in possession of the present disclosure. Yet further still, data paths provided in the storage device 206/300 in response to commands may include one or more data path stages performed by the NAND controller subsystem 310 to scramble data, descramble data, encrypt data, decrypt data, perform Redundant Array of Independent Disk (RAID) operations, and/or provide any other NAND controller functionality that would be apparent to one of skill in the art in possession of the present disclosure. As will be appreciated by one of skill in the art in possession of the present disclosure, data path stages like those discussed above may be "mixed and matched" to perform any read operation, write operation, other I/O operation, background operation, and/or other operation in the storage device 206/300.

As such, data path stages providing data paths to execute commands may differ across different types of commands or even within the same types of commands. For example, read commands may be handled by the FTL/buffer controller subsystem 308 and without use of the firmware subsystem 306 unless the data being read is above 5 MB in size and requires the firmware subsystem 306 to break that data up into increments that may be stored in buffers in the storage device 206/300, while write commands typically require the use of the firmware subsystem 306. As such, data paths and their data path stages may be handled by different storage device subsystems at different speeds when a plurality of commands are executed by the storage device 206/300.

In an embodiment, at block 402, the non-fatal error debug engine 208 in the storage device 206/300 may provide a respective counter system for each of the data path stages that may be performed by the storage device subsystems in the storage device 206/300 (e.g., the PCIe controller subsystem 302, the NVMe controller subsystem 304, the firmware subsystem 306, the FTL/buffer controller subsystem 308, the NAND controller subsystem 310, and/or the NAND subsystem in the embodiment of the storage device 300 illustrated in FIG. 3) to provide one or more data paths in the storage device 206/300. For example, with reference back to the data path 500 of FIG. 5, a counter system may be provided for the data path stage 502 that, in the illustrated embodiment, includes an ingress counter 502a and an egress counter 502b; a counter system may be provided for the data path stage 504 that, in the illustrated embodiment, includes an ingress counter 504a and an egress counter 504b; a counter system may be provided for the data path stage 506 that, in the illustrated embodiment, includes an ingress counter 506a and an egress counter 506b; as well as counter systems provided for any other data path stages in the data path 500 up to a counter system for the data path stage 508 that, in the illustrated embodiment, includes an ingress counter 508a and an egress counter 508b. Thus, some embodiments of block 402 may include providing a counter system for each data path stage that may be performed by storage device subsystems in the storage device 206/300, but embodiments in which counter systems are provided for a subset of the data path stages that may be performed by storage device subsystems in the storage device 206/300 will fall within the scope of the present disclosure as well.

Furthermore, in some embodiments of block 402, the counter system provided for any data path stage may include resource performance counters that track the performance of resource subsystems utilized by that data path stage. For example, with reference to FIG. 6, a data path stage 600 is illustrated and may provide any of the data path stages 502-508 discussed above with reference to FIG. 5. As illustrated, the data path stage 600 may utilize a plurality of resource subsystems 602a, 602b, and up to 602c. For example, the resource subsystems 602a-602c may be provided by buffers, queues, processors, and/or other resources that one of skill in the art in possession of the present disclosure will appreciate may be included in the storage device 206/300. As illustrated, the counter system provided for the data path stage 600 may include a resource performance egress counter 604a and a resource performance ingress counter 604b for the resource subsystem 602a, a resource performance egress counter 606a and a resource performance ingress counter 606b for the resource subsystem 602b, and up to a resource performance egress counter 608a and a resource performance ingress counter 608b for the resource subsystem 602c, and one of skill in the art in possession of the present disclosure will appreciate how the counters 602a/602b, 604a/604b, and 606a/606b may be configured in a variety of manners in order to provide for the monitoring, tracking, and/or determinations of the performance, usage, and/or other operation of the resource subsystems 602a-602c. However, while the provisioning of a few specific counter systems has been described, one of skill in the art in possession of the present disclosure will appreciate how other counter subsystems may be provided to enable the functionality discussed below while remaining within the scope of the present disclosure.

Figure 7:
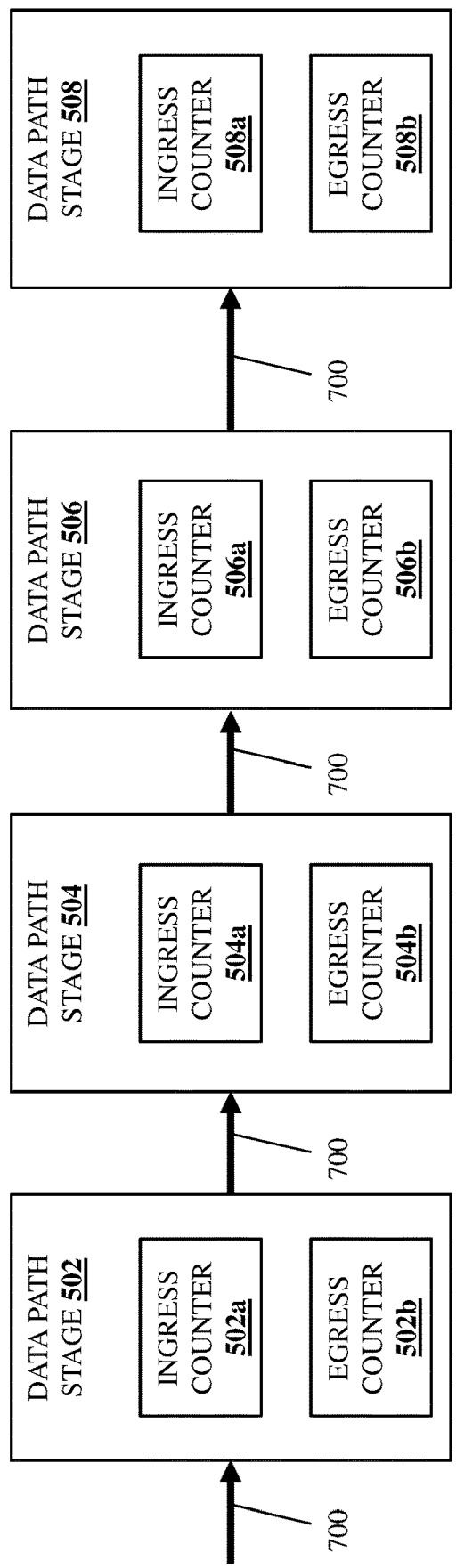
FIG. 7 is a schematic view illustrating an embodiment of the data path of FIG. 5 operating during the method of FIG. 4.

The method 400 then proceeds to block 404 where a non-fatal error debug system monitors each counter system during execution of commands by the storage device subsystems via the performance of the data path stages. With reference to FIG. 7, in an embodiment of block 404, the storage device subsystems (or a subset thereof) in the storage device 206/300 may perform data path stage performance operations 700 that include performing the plurality of data path stages 502-508 in response to commands received from the host engine 204 in order to execute those commands and provide a plurality of data paths in the storage device 206/300. Furthermore, at block 404 and during the data path stage performance operations 700, the non-fatal error debug engine 208 in the storage device 206/300 may monitor the counter systems provided for the data path stages 502, and one of skill in the art in possession of the present disclosure will appreciate how the counter systems may be monitored continuously, periodically, and/or at any frequency while remaining within the scope of the present disclosure.

For example, in the embodiment illustrated in FIG. 7, the data path stage performance operations 700 may include the ingress counter 502a for the data path stage 502 being incremented in association with the initiation of the performance of the data path stage 502 for any command, and the egress counter 502b for the data path stage 502 being incremented in association with the results of the performance of the data path stage 502 for any command; the ingress counter 504a for the data path stage 504 being incremented in association with the initiation of the performance of the data path stage 504 for any command, and the egress counter 504b for the data path stage 504 being incremented in association with the results of the performance of the data path stage 504 for any command; the ingress counter 506a for the data path stage 506 being incremented in association with the initiation of the performance of the data path stage 506 for any command, and the egress counter 506b for the data path stage 506 being incremented in association with the results of the performance of the data path stage 506 for any command; and up to the ingress counter 508a for the data path stage 508 being incremented in association with the initiation of the performance of the data path stage 508 for any command, and the egress counter 508b for the data path stage 508 being incremented in association with the results of the performance of the data path stage 508 for any command.

To provide a specific example of the incrementing of ingress and egress counters for a data path stage, the ingress counter may be incremented in response to a request to perform that data path stage, with the egress counter being incremented in response to the completion of the performance of that data path stage that provides the results of that data path stage, and the egress counter not being incremented in the event the performance of that data path stage is not completed. To provide another specific example of the incrementing of ingress and egress counters for a data path stage, the ingress counter may be incremented a number of times for a number of results requested via the performance of that data path stage (e.g., a number of buffers that should be prepared), with the egress counter being incremented a number of times for the number of results actually provided in response to the performance of that data path stage (e.g., the number of buffers that were actually prepared in response to the performance of that data path stage). However, while two specific examples of the incrementing of ingress and egress counters in a counter system have been described, one of skill in the art in possession of the present disclosure will appreciate how counter systems may track the performance of data path stages in other manners that will fall within the scope of the present disclosure as well.

Figure 8:
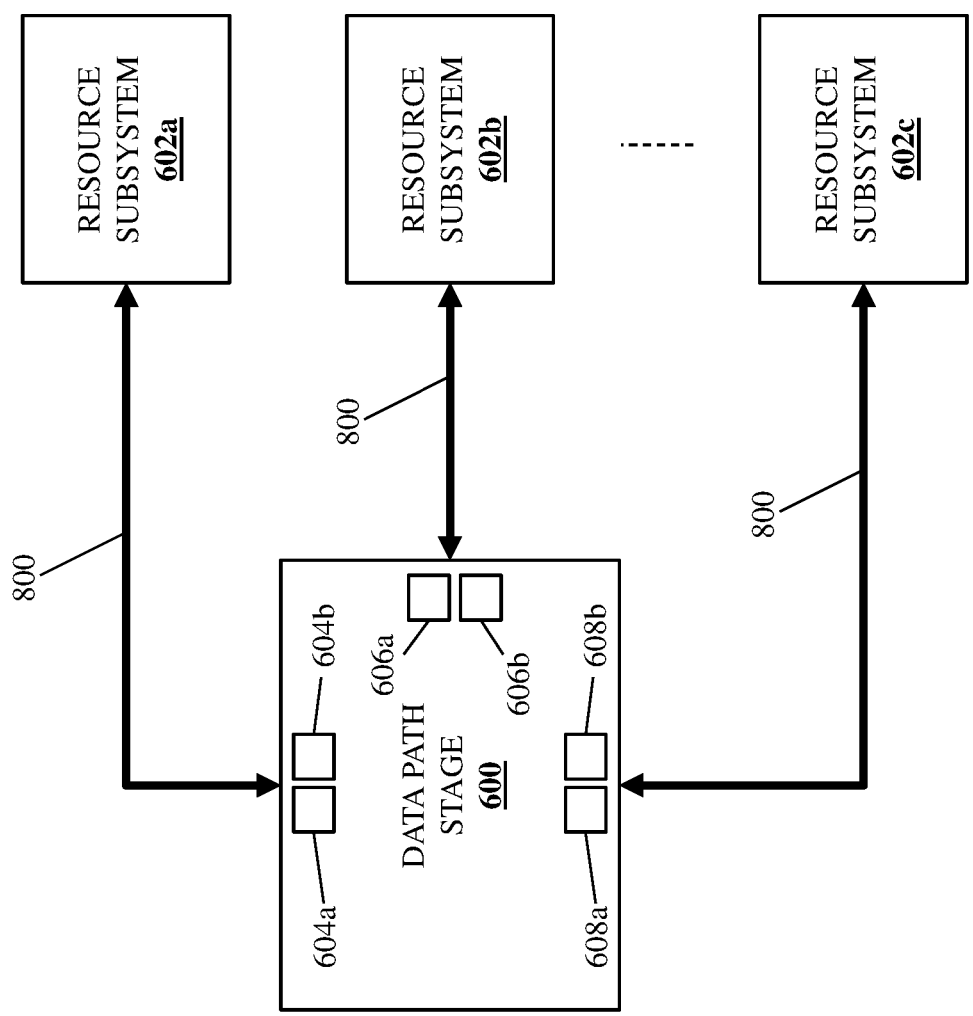
FIG. 8 is a schematic view illustrating an embodiment of the data path stage of FIG. 6 operating during the method of FIG. 4.

With reference to FIG. 8, in an embodiment of block 404, a storage device subsystem in the storage device 206/300 performing the data path stage 600 (which may be any of the storage device subsystems in the storage device 206/300 performing any data path stage in a data path) may perform resource utilization operations 800 that include utilizing the resource subsystems 602a-602c in response to a commands received from the host engine 204 in order to execute those commands and provide a plurality of data paths in the storage device 206/300. Furthermore, at block 404 and during the resource utilization operations 800, the non-fatal error debug engine 208 in the storage device 206/300 may monitor the counter system provided for the data path stage 600, and one of skill in the art in possession of the present disclosure will appreciate how the counter system may be monitored continuously, periodically, and/or at any frequency while remaining within the scope of the present disclosure.

For example, in the embodiment illustrated in FIG. 8, the resource utilization operations 800 may include the resource performance egress counter 604a for the resource subsystem 602a being incremented in association with the initiation of the use of the resource subsystem 602a for any command, and the resource performance ingress counter 604b for the resource subsystem 602a being incremented in association with a confirmation of the use of the resource subsystem 602a for any command; the resource performance egress counter 606a for the resource subsystem 602b being incremented in association with the initiation of the use of the resource subsystem 602b for any command, and the resource performance ingress counter 606b for the resource subsystem 602b being incremented in association with a confirmation of the use of the resource subsystem 602b for any command; and up to the resource performance egress counter 608a for the resource subsystem 602c being incremented in association with the initiation of the use of the resource subsystem 602c for any command, and the resource performance ingress counter 608b for the resource subsystem 602c being incremented in association with a confirmation of the use of the resource subsystem 602c for any command.

To provide a specific example of the incrementing of resource performance ingress and egress counters for a resource subsystem used by a data path stage, the resource performance egress counter may be incremented in response to the initiation of the use of a buffer, queue, processor, or other resource subsystem in the storage device 206/300, and the resource performance ingress counter may be incremented in response to the confirmation of the use of that buffer, queue, processor, or other resource subsystem in the storage device 206/300. As will be appreciated by one of skill in the art in possession of the present disclosure, the resource performance ingress and egress counters allow for the detection of buffer starvation, queue starvation, processor starvation, and/or other resource subsystem starvation that would be apparent to one of skill in the art in possession of the present disclosure. However, while a specific example of the use of resource performance ingress and egress counters in a counter system have been described, one of skill in the art in possession of the present disclosure will appreciate how counter systems may track the performance of resource subsystems used by data path stages in other manners that will fall within the scope of the present disclosure as well.

The method 400 then proceeds to decision block 406 where it is determined whether a counter system provided for a data path stage performed by a storage device subsystem to provide a data path in the storage device indicates a non-fatal error. In an embodiment, at decision block 406, the non-fatal error debug engine 208 in the storage device 206/300 may determine whether any of the counter systems monitored at block 404 indicate a non-fatal error in the storage device 206/300. For example, for any of the data path stages 502-508 in the data path 500 discussed above, the non-fatal error debug engine 208 may monitor the ingress and egress counter for that data path stage to determine if those ingress and egress counters are incrementing and, if so, whether a difference between that ingress counter and that egress counter exceeds an ingress/egress threshold for two or more performances of that data path stage. As will be appreciated by one of skill in the art in possession of the present disclosure, in the event the ingress counter and egress counter for a data path stage is incrementing or otherwise progressing, a threshold difference between that ingress and egress counter over multiple performances of that data path stage may indicate that the performance of that data path stage is not providing results that would otherwise be expected in response to its initiation, and may produce a non-fatal error that may result in the operation "hangs", timeouts, performance degradation, and/or other storage devices issues discussed above.

In another example, for the data path 600 discussed above, the non-fatal error debug engine 208 may monitor the resource performance egress and ingress counters for the resource subsystems 602a, 602b, and 602c used by that data path stage to determine whether a difference between initiations of the use of a resource subsystem tracked by the resource performance egress counter and confirmations of the use of that resource subsystem tracked by the egress counter exceeds a resource performance egress/ingress threshold. As will be appreciated by one of skill in the art in possession of the present disclosure, a threshold difference between the egress counter and ingress counter for a resource subsystem used by a data path stage may indicate resource subsystem starvation such as the buffer starvation, queue starvation, and/or processor starvation discussed above, and may produce a non-fatal error that may result in the operation "hangs", timeouts, performance degradation, and/or other storage devices issues discussed above. However, while two specific examples of counter systems indicating a non-fatal error have been described, one of skill in the art in possession of the present disclosure will appreciate how the counter systems of the present disclosure may indicate a variety of other non-fatal errors while remaining within the scope of the present disclosure as well.

If, at decision block 406, it is determined that no counter system provided for a data path stage performed by a storage device subsystem to provide a data path in the storage device indicates a non-fatal error, the method 400 returns to block 404. As such, the method 400 may loop to monitor each counter system during execution of commands by the storage device subsystems via the performance of the data path stages as long as none of the counter systems indicate a non-fatal error.

If at decision block 406, it is determined that a counter system provided for a data path stage performed by a storage device subsystem to provide a data path in the storage device indicates a non-fatal error, the method 400 proceeds to block 408 where the non-fatal error debug system collects debug information associated with the data path provided by the storage device subsystem performing the data path stage with the counter system indicating the non-fatal error. In an embodiment, at block 408 and in response to determining a counter system (e.g., the counter system provided for the data path stage 504 in FIG. 5) indicates a non-fatal error, the non-fatal error debug engine 208 in the storage device 206/300 may retrieve debug information associated with the data path stage provided with that counter system (e.g., the data path stage 504), debug information associated with data path stages immediately adjacent the data path stage provided with that counter system (e.g., the data path stages 502 and 506), and/or any other data-path-stage-specific debug information that would be apparent to one of skill in the art in possession of the present disclosure.

For example, debug information may be captured via a snapshot of the data path stage that identifies the current state of the counter system(s) provided for that stage, data structures used in that data path stage (e.g., a data structure of a state machine used in that data path stage), and/or other data path stage characteristics that would be apparent to one of skill in the art in possession of the present disclosure. In specific examples, debug information may include information stored in receive 4K read request counters, complete 4K read request counters, receive 4K write request counters, complete 4K write request counters, and/or any other debug information that would be apparent to one of skill in the art in possession of the present disclosure.

Figure 6:
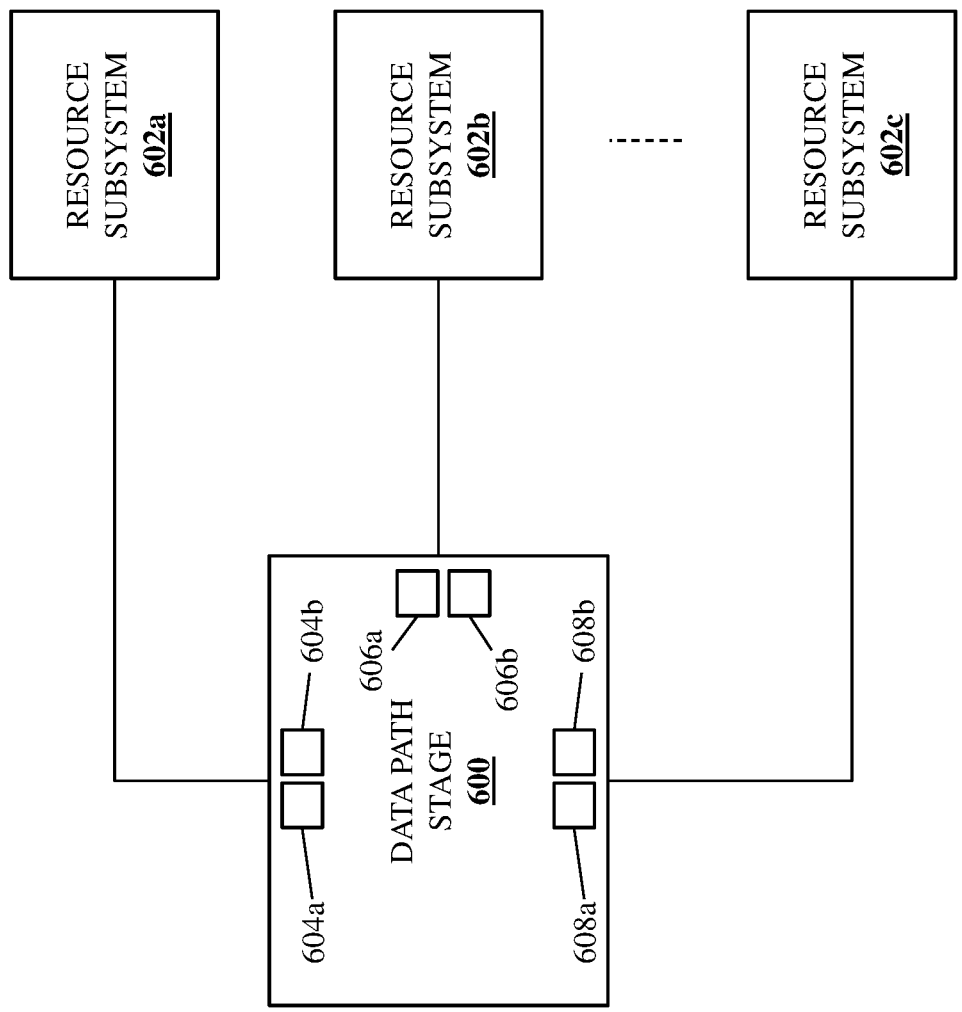
FIG. 6 is a schematic view illustrating an embodiment of a data path stage that may be included in the data path during the method of FIG. 4.

In an embodiment, at block 408 and in response to determining a counter system (e.g., the counter system provided for the resource system 602b in FIG. 6) indicates a non-fatal error, the non-fatal error debug engine 208 in the storage device 206/300 may retrieve debug information associated with the data path stage provided with that counter system (e.g., the data path stage 600), debug information associated with a resource subsystem provided with that counter system (e.g., the resource subsystem 602b), and/or any other data-path-stage-specific debug information that would be apparent to one of skill in the art in possession of the present disclosure. In specific examples, data-path-stage-specific debug information may include a receive 4K read request structure (e.g., an LBA, buffer, and pointer to an original host I/O request in that receive 4K read request structure), a complete 4K read request structure (e.g., an LBA, buffer, and pointer to an original host I/O request in that complete 4K read request structure), a receive 4K write request structure (e.g., an LBA, buffer, and pointer to an original host I/O request in that receive 4K write request structure), a complete 4K write request structure (e.g., an LBA, buffer, and pointer to an original host I/O request in that complete 4K write request structure), and/or any other data-path-stage-specific debug information that would be apparent to one of skill in the art in possession of the present disclosure.

In some embodiments, the debug information retrieved at block 408 may be persistently stored in the storage device 206/208. For example, the non-fatal error debug engine 208 in the storage device 206/300 may store any debug information retrieved at block 408 in the NAND subsystem 312, in a NOR subsystem, and/or in any other persistent storage that would be apparent to one of skill in the art in possession of the present disclosure. As will be appreciated by one of skill in the art in possession of the present disclosure, the provisioning of multiple data paths in the storage device 206/300 may (and often will) result in the counter systems in different data path stages that provide different data paths triggering the collection of multiple sets of debug information for different data paths, and may include retrieving the debug information for any of those data paths over time as that debug information is generated subsequent to identifying a non-fatal error, as well as persistently storing that debug information for that data path in the order it was retrieved over time.

The method 400 then returns to block 404. As such, the method 400 may loop such that debug information is collected any time a counter system provided for a data path stage in a data path indicates a non-fatal error. Following the method 400, a network administrator or other user may retrieve the debug information for any non-fatal error occurring in the storage device 206/300. For example, in response to an operation associated with the storage device "hanging", timing out, or experiencing a performance degradation, a network administrator or other user may restart the storage device, and may then retrieve any of the debug information that was persistently stored in the storage device following the identification of the non-fatal error (e.g., the most recently stored debug information, debug information associated with the operation that "hung", timed out, or experienced a performance degradation, etc.) One of skill in the art in possession of the present disclosure will recognize how a variety of debugging techniques may then be utilized with that debug information in order to debug the storage device in order to, for example, determine a root cause of the non-fatal error.

Thus, systems and methods have been described that provide for the debugging of non-fatal errors in storage device by monitoring counters provided for data path stages in one or more data paths in the storage device to detect whether abnormal conditions exist and, if so, collecting debug information for use in debugging the non-fatal error. For example, the storage device non-fatal error debug system may include a storage device including a storage device chassis, storage device subsystems housed in the storage device chassis, and a non-fatal error debug subsystem provided in the storage device chassis and coupled to each of the storage device subsystems. The non-fatal error debug subsystem provides a counter system for each of a plurality of data path stages performed by the storage device subsystems to provide data path(s) in the storage device, and monitors each counter system during the execution of commands by the storage device subsystems via the performance of the data path stages. When the non-fatal error debug subsystem determines that a counter system provided for a data path stage performed by a storage device subsystem to provide a data path in the storage device indicates a non-fatal error, it collects debug information associated with that data path stage. As such, the root cause of non-fatal errors in storage devices may be identified and, in some cases, corrected.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage device non-fatal error debug system, comprising:
   a Solid State Drive (SSD) storage device including an SSD storage device chassis;
   a plurality of SSD storage device subsystems housed in the SSD storage device chassis; and
   a non-fatal error debug subsystem that is provided in the SSD storage device chassis and coupled to each of the plurality of SSD storage device subsystems, wherein the non-fatal error debug subsystem is configured to:
      provide a respective counter system for each of a plurality of data path stages performed by the plurality of SSD storage device subsystems to provide at least one data path in the SSD storage device, wherein each counter system includes both of: 1) a first counter that is configured to be incremented in association with the initiation of the performance of the data path stage for which that counter system is provided, and 2) a second counter that is configured to be incremented in association with the performance of the data path stage for which that counter system is provided;
      monitor each counter system during the execution of commands by the plurality of SSD storage device subsystems via the performance of the plurality of data path stages;
      determine that a first counter system provided for a first data path stage performed by a first SSD storage device subsystem to provide a first data path in the SSD storage device indicates a non-fatal error; and
      collect, in response to determining that the first counter system indicates the non-fatal error, debug information associated with the first data path stage.

2. The system of claim 1, wherein the first counter in the first counter system is provided by a first data path stage ingress counter that increments in response to requests to perform the first data path stage, and the second counter in the first counter system is provided by a first data path stage egress counter that increments in response to performance of the first data path stage.

3. The system of claim 2, wherein the determining that the first counter system indicates the non-fatal error includes determining that a difference between the first data path stage ingress counter and the first data path stage egress counter exceeds a first data path stage ingress/egress threshold for two or more performances of the first data path stage.

4. The system of claim 1, wherein the first counter system includes one or more resource usage counters that each increment in response to the use of a respective resource to perform the first data path stage.

5. The system of claim 4, wherein the determining that the first counter system indicates the non-fatal error includes determining that a first resource usage counter that provides the second counter in the first counter system is below a first resource usage threshold for a first resource used to perform the first data path stage.

6. The system of claim 1, wherein the collecting the debug information associated with the first data path stage includes:
retrieving the debug information over time as the debug information is generated subsequent to the determining that the first counter system indicates a non-fatal error; and
persistently storing the debug information in the order it was retrieved over time.

7. A Solid State Drive (SSD) storage device, comprising:
a Solid State Drive (SSD) storage device chassis;
a processing system that is housed in the SSD chassis; and
a memory system that is housed in the SSD chassis, that is coupled to the processing system, and that includes instructions that, when executed by the processing system, cause the processing system to provide a non-fatal error debug engine that is configured to:
provide a respective counter system for each of a plurality of data path stages performed by a plurality of SSD storage device subsystems in the SSD storage device chassis to provide at least one data path, wherein each counter system includes both of: 1) a first counter that is configured to be incremented in association with the initiation of the performance of the data path stage for which that counter system is provided, and 2) a second counter that is configured to be incremented in association with the performance of the data path stage for which that counter system is provided;
monitor each counter system during the execution of commands by the plurality of SSD storage device subsystems via the performance of the plurality of data path stages;
determine that a first counter system provided for a first data path stage performed by a first SSD storage device subsystem to provide a first data path indicates a first non-fatal error; and
collect, in response to determining that the first counter system indicates the first non-fatal error, debug information associated with the first data path stage.

8. The SSD storage device of claim 7, wherein the first counter in the first counter system is provided by a first data path stage ingress counter that increments in response to requests to perform the first data path stage, and the second counter in the first counter system is provided by a first data path stage egress counter that increments in response to performance of the first data path stage.

9. The SSD storage device of claim 8, wherein the determining that the first counter system indicates the first non-fatal error includes determining that a difference between the first data path stage ingress counter and the first data path stage egress counter exceeds a first data path stage ingress/egress threshold for two or more performances of the first data path stage.

10. The SSD storage device of claim 7, wherein the first counter system includes one or more resource usage counters that each increment in response to the use of a respective resource to perform the first data path stage.

11. The SSD storage device of claim 10, wherein the determining that the first counter system indicates the first non-fatal error includes determining that a first resource usage counter that provides the second counter in the first counter system is below a first resource usage threshold for a first resource used to perform the first data path stage.

12. The SSD storage device of claim 7, wherein the collecting the debug information associated with the first data path stage includes:
retrieving the debug information over time as the debug information is generated subsequent to the determining that the first counter system indicates the first non-fatal error; and
persistently storing the debug information in the order it was retrieved over time.

13. The SSD storage device of claim 7, wherein the non-fatal error debug engine is configured to:
determine that a second counter system provided for a second data path stage performed by a second SSD storage device subsystem to provide a second data path that is different than the first data path indicates a second non-fatal error; and
collect, in response to determining that the second counter system indicates the second non-fatal error, debug information associated with the second data path stage.

14. A method for debugging non-fatal errors in a storage device, comprising:
providing, by a non-fatal error debug subsystem included in an Solid State Drive (SSD) storage device chassis of an SSD storage device, a respective counter system for each of a plurality of data path stages performed by a plurality of SSD storage device subsystems in the SSD storage device chassis to provide at least one data path, wherein each counter system includes both of: 1) a first counter that is configured to be incremented in association with the initiation of the performance of the data path stage for which that counter system is provided, and 2) a second counter that is configured to be incremented in association with the performance of the data path stage for which that counter system is provided;
monitoring, by the non-fatal error debug subsystem, each counter system during the execution of commands by the plurality of SSD storage device subsystems via the performance of the plurality of data path stages;
determining, by the non-fatal error debug subsystem, that a first counter system provided for a first data path stage performed by a first SSD storage device subsystem to provide a first data path indicates a first non-fatal error; and
collecting, by the non-fatal error debug subsystem in response to determining that the first counter system indicates the first non-fatal error, debug information associated with the first data path stage.

15. The method of claim 14, wherein the first counter in the first counter system is provided by a first data path stage ingress counter that increments in response to requests to perform the first data path stage, and the second counter in the first counter system is provided by a first data path stage egress counter that increments in response to performance of the first data path stage.

16. The method of claim 15, wherein the determining that the first counter system indicates the first non-fatal error includes determining that a difference between the first data path stage ingress counter and the first data path stage egress counter exceeds a first data path stage ingress/egress threshold for two or more performances of the first data path stage.

17. The method of claim 14, wherein the first counter system includes one or more resource usage counters that each increment in response to the use of a respective resource to perform the first data path stage.

18. The method of claim 17, wherein the determining that the first counter system indicates the first non-fatal error includes determining that a first resource usage counter that provides the second counter in the first counter system is below a first resource usage threshold for a first resource used to perform the first data path stage.

19. The method of claim 14, wherein the collecting the debug information associated with the first data path stage includes:

retrieving, by the non-fatal error debug subsystem, the debug information over time as the debug information is generated subsequent to the determining that the first counter system indicates the first non-fatal error; and persistently storing, by the non-fatal error debug subsystem, the debug information in the order it was retrieved over time.

20. The method of claim 14, further comprising:

determining, by the non-fatal error debug subsystem, that a second counter system provided for a second data path stage performed by a second SSD storage device subsystem to provide a second data path that is different than the first data path indicates a second non-fatal error; and collecting, by the non-fatal error debug subsystem in response to determining that the second counter system indicates the second non-fatal error, debug information associated with the second data path stage.

* * * * *